United States Patent
Prakash Porecha et al.

(10) Patent No.: US 12,443,592 B1
(45) Date of Patent: *Oct. 14, 2025

(54) HIGH-SCALE PROCESSING OF INGESTED GENERAL LEDGER DATA WITH DELTA DETECTION

(71) Applicant: Planful, Inc., San Francisco, CA (US)

(72) Inventors: Jatan Prakash Porecha, Hyderabad (IN); Mridul Mundara, Kota (IN)

(73) Assignee: Planful, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/805,186

(22) Filed: Aug. 14, 2024

Related U.S. Application Data (63) Continuation of application No. 17/822,062, filed on Aug. 24, 2022, now Pat. No. 12,086,131.

(60) Provisional application No. 63/337,141, filed on May 1, 2022.

(51) Int. Cl.
   G06F 16/23 (2019.01)
   G06F 16/22 (2019.01)

(52) U.S. Cl.
   CPC ...... *G06F 16/2379* (2019.01); *G06F 16/2237* (2019.01); *G06F 16/2358* (2019.01)

(58) Field of Classification Search
   CPC ............. G06F 16/2379; G06F 16/2237; G06F 16/2358
   See application file for complete search history.

(56) References Cited

U.S. PATENT DOCUMENTS

| | | | |
|---|---|---|---|
| 5,890,151 | A | 3/1999 | Agarwal |
| 9,983,670 | B2 * | 5/2018 | Coleman ................ G16H 40/60 |
| 10,333,696 | B2 * | 6/2019 | Ahmed ................. H04L 9/3268 |
| 2005/0001745 | A1 | 1/2005 | Sankaran |
| 2009/0254572 | A1 | 10/2009 | Redlich |
| 2010/0250497 | A1 * | 9/2010 | Redlich ................. G06Q 10/06 707/661 |
| 2019/0311367 | A1 | 10/2019 | Reddy |
| 2021/0342785 | A1 * | 11/2021 | Mann ................... G06F 40/186 |
| 2022/0019950 | A1 | 1/2022 | Sabri |
| 2022/0350640 | A1 | 11/2022 | Rao |

\* cited by examiner

*Primary Examiner* — Angelica Ruiz
(74) *Attorney, Agent, or Firm* — Adibi IP Group, PC; Amir V. Adibi; Andrew C. Palmer

(57) ABSTRACT

A system comprises a computing system, an Enterprise Resource Planning (ERP) system, and a relational database management system (RDBMS). Ledger data is received onto the computing system and stored in a first data structure. Aggregated values over one or more time periods are determined and stored in the first data structure. Next, stored ledger data stored in a database is retrieved and stored in a second data structure. The first and second data structures are stored in continuous blocks of memory and are highly amenable to caching, thereby improving system performance. One or more bit arrays are generated by comparing values stored in the first and second data structures. These bit arrays indicate data change state between stored and received ledger data. Bit counting yields bit count sums that scalably identify costly database operations for received data across many accounts. Database operations are scheduled intelligently using bit count sums.

11 Claims, 12 Drawing Sheets

LEDGER DATA PROCESSING SYSTEM WITH DELTA DETECTION

LEDGER DATA PROCESSING SYSTEM
WITH DELTA DETECTION
FIG. 1

DATA STRUCTURE TYPE IN MEMORY
(E.G. 12 MONTHS OF LEDGER DATA)

FIG. 2

PORTION OF
RECEIVED
LEDGER DATA
32

ACCOUNT IDENTIFIER
33

| SEG1 | SEG2 | SEG3 | SEG4 | TIME | Value |
|---|---|---|---|---|---|
| Sales | Comp1 | Dept1 | Proj1 | Jan-22 | 1000 |
| Sales | Comp1 | Dept1 | Proj1 | Feb-22 | 1500 |
| Sales | Comp1 | Dept2 | Proj1 | Mar-22 | 4000 |
| Sales | Comp2 | Dept1 | Proj1 | Mar-22 | 2000 |
| Sales | Comp1 | Dept1 | Proj1 | Mar-22 | 1200 |
| Sales | Comp1 | Dept2 | Proj1 | Apr-22 | 2000 |

ERP SYSTEM 12 OUTPUTS ONLY MTD DATA FOR EACH ACCOUNT (NO QTD/YTD AVAILABLE)

EXAMPLE OF PORTION OF RECEIVED LEDGER DATA
FIG. 3

FIG. 4

PORTION OF
RECEIVED
LEDGER DATA
32

| | | Jan-22 | | | Feb-22 | | | Mar-22 | | | Apr-22 | | |
|---|---|---|---|---|---|---|---|---|---|---|---|---|---|
| | | MTD | QTD | YTD | MTD | QTD | YTD | MTD | QTD | YTD | MTD | QTD | YTD |
| Sales-Comp1-Dept1-Proj1 | RECEIVED LEDGER DATA | 1000 | 0 | 0 | 1500 | 0 | 0 | 1200 | 0 | 0 | 0 | 0 | 0 |
| Sales-Comp1-Dept2-Proj1 | RECEIVED LEDGER DATA | 0 | 0 | 0 | 0 | 0 | 0 | 0 | 0 | 0 | 0 | 0 | 0 |
| Sales-Comp2-Dept1-Proj1 | RECEIVED LEDGER DATA | 0 | 0 | 0 | 0 | 0 | 0 | 2000 | 0 | 0 | 0 | 0 | 0 |

...

PORTION OF RECEIVED LEDGER DATA IN TABLE FORM
(BEFORE AGGREGATING QTD/YTD VALUES)

FIG. 5

PORTION OF RECEIVED LEDGER DATA IN MEMORY
AFTER AGGREGATING VALUES OVER QTD/YTD

FIG. 6

PORTION OF
RECEIVED
LEDGER DATA
32

| | | Jan-22 | | | Feb-22 | | | Mar-22 | | | Apr-22 | | |
|---|---|---|---|---|---|---|---|---|---|---|---|---|---|
| | | MTD | QTD | YTD | MTD | QTD | YTD | MTD | QTD | YTD | MTD | QTD | YTD |
| Sales-Comp1-Dept1-Proj1 | RECEIVED LEDGER DATA | 1000 | 1000 | 1000 | 1500 | 2500 | 2500 | 1200 | 2700 | 2700 | 0 | 0 | 2700 |
| Sales-Comp1-Dept2-Proj1 | RECEIVED LEDGER DATA | 0 | 0 | 0 | 0 | 0 | 0 | 0 | 0 | 0 | 0 | 0 | 0 |
| Sales-Comp2-Dept1-Proj1 | RECEIVED LEDGER DATA | 0 | 0 | 0 | 0 | 0 | 0 | 2000 | 2000 | 2000 | 0 | 0 | 2000 |

PORTION OF RECEIVED LEDGER DATA IN TABLE FORM
AFTER AGGREGATING VALUES OVER QTD/YTD

FIG. 7

PORTION OF
STORED LEDGER
DATA
34

|  |  | Jan-22 | | | Feb-22 | | | Mar-22 | | | Apr-22 | | |
|---|---|---|---|---|---|---|---|---|---|---|---|---|---|
|  |  | MTD | QTD | YTD | MTD | QTD | YTD | MTD | QTD | YTD | MTD | QTD | YTD |
| Sales-Comp1-Dept1-Proj1 | STORED LEDGER DATA | 0 | 0 | 0 | 800 | 800 | 800 | 1000 | 1800 | 1800 | 0 | 0 | 1800 |
| Sales-Comp1-Dept2-Proj1 | STORED LEDGER DATA | 0 | 0 | 0 | 0 | 0 | 0 | 3000 | 3000 | 3000 | 0 | 0 | 3000 |
| Sales-Comp2-Dept1-Proj1 | STORED LEDGER DATA | 0 | 0 | 0 | 0 | 0 | 0 | 0 | 0 | 0 | 0 | 0 | 0 |

STORED LEDGER DATA CORRESPONDING TO
PORTION OF RECEIVED LEDGER DATA

FIG. 8

| | STORED DATA LOADED IN MEMORY FOR ACCOUNT "Sales-Comp1-Dept1-Proj1" | STORED DATA LOADED IN MEMORY FOR ACCOUNT "Sales-Comp1-Dept2-Proj1" | STORED DATA LOADED IN MEMORY FOR ACCOUNT "Sales-Comp2-Dept1-Proj1" |
|---|---|---|---|
| January Ledger Data (48 bytes) | 0, 0, 0 | 0, 0, 0 | 0, 0, 0 |
| February Ledger Data (48 bytes) | 800, 800, 800 | 0, 0, 0 | 0, 0, 0 |
| March Ledger Data (48 bytes) | 1000, 1800, 1800 | 3000, 3000, 3000 | 0, 0, 0 |
| APRIL Ledger Data (48 bytes) | 0, 0, 1800 | 0, 0, 3000 | 0, 0, 0 |

PORTIONS OF STORED LEDGER DATA LOADED INTO NOVEL DATA STRUCTURES IN MEMORY

| State | MSB | LSB |
|---|---|---|
| No Change | 0 | 0 |
| Inserted | 0 | 1 |
| Updated | 1 | 0 |
| Deleted | 1 | 1 |

DATA CHANGE STATE TRUTH TABLE

FIG. 10

|  |  | Jan-22 | | | Feb-22 | | | Mar-22 | | | Apr-22 | | |
| --- | --- | --- | --- | --- | --- | --- | --- | --- | --- | --- | --- | --- | --- |
|  |  | MTD | QTD | YTD | MTD | QTD | YTD | MTD | QTD | YTD | MTD | QTD | YTD |
| Sales-Comp1-Dept1-Proj1 | Stored | 0 | 0 | 0 | 800 | 800 | 800 | 1000 | 1800 | 1800 | 0 | 0 | 1800 |
|  | Received | 1000 | 1000 | 1000 | 1500 | 2500 | 2500 | 1200 | 2700 | 2700 | 0 | 0 | 2700 |
|  | State | Insert | | | Update | | | Update | | | Update | | |
|  | MSB | 0 | | | 1 | | | 1 | | | 1 | | |
|  | LSB | 1 | | | 0 | | | 0 | | | 0 | | |
| Sales-Comp1-Dept2-Proj1 | Stored | 0 | 0 | 0 | 0 | 0 | 0 | 3000 | 3000 | 3000 | 0 | 0 | 3000 |
|  | Received | 0 | 0 | 0 | 0 | 0 | 0 | 0 | 0 | 0 | 0 | 0 | 0 |
|  | State | No change | | | No change | | | DELETE | | | DELETE | | |
|  | MSB | 0 | | | 0 | | | 1 | | | 1 | | |
|  | LSB | 0 | | | 0 | | | 1 | | | 1 | | |
| Sales-Comp2-Dept1-Proj1 | Stored | 0 | 0 | 0 | 0 | 0 | 0 | 0 | 0 | 0 | 0 | 0 | 0 |
|  | Received | 0 | 0 | 0 | 0 | 0 | 0 | 2000 | 2000 | 2000 | 0 | 0 | 2000 |
|  | State | No change | | | No change | | | Insert | | | Insert | | |
|  | MSB | 0 | | | 0 | | | 0 | | | 0 | | |
|  | LSB | 0 | | | 0 | | | 1 | | | 1 | | |

COMPARING RECEIVED AND STORED LEDGER DATA
AND GENERATING BIT ARRAYS
(DELTA DETECTION)

HIGH-SCALE PROCESSING OF INGESTED GENERAL LEDGER DATA WITH DELTA DETECTION

CROSS REFERENCE TO RELATED APPLICATIONS

This application is a continuation of, and claims the benefit under 35 U.S.C. § 120 from, nonprovisional U.S. patent application Ser. No. 17/822,062, entitled "High-Scale Processing Of Ingested General Ledger Data With Delta Detection," filed on Aug. 24, 2022. U.S. patent application Ser. No. 17/822,062 claims the benefit under 35 U.S.C. § 119 from U.S. Provisional Patent Application Ser. No. 63/337,141, entitled "System To Process General Ledger Data In Cache With Delta Detection," filed on May 1, 2022. The subject matter of each of the foregoing documents is expressly incorporated herein by reference.

TECHNICAL FIELD

The present invention relates generally to data processing, and more specifically, to ledger data processing systems.

BACKGROUND INFORMATION

Business enterprises typically involve commercial activities across many categories. Most businesses utilize enterprise resource planning (ERP) systems to manage these business processes. ERP systems collect, generate, and output data that span many dimensions. Such multidimensional data is used by businesses to manage operations and gain insights on how their businesses operate.

SUMMARY

A ledger data processing system comprises a computing system, an Enterprise Resource Planning (ERP) system, and a relational database management system (RDBMS). The computing system includes a processor, a memory, and a thread scheduler. Certain database operations are computationally more costlier than others. A novel method and data structure are used to optimize ingestion of large quantities of data. The processor schedules database operations via the thread scheduler using the novel method and data structure.

In operation, ledger data is received onto a computing system. The ledger data is stored in a first data structure in memory. Aggregated values over one or more time periods are determined from the ledger data and stored in the first data structure. The first data structure is storable in a first continuous block of memory. Next, stored ledger data stored in the database is retrieved and stored in a second data structure in memory. The second data structure is storable in a second continuous block of memory. One or more bit arrays are generated by comparing values stored in the first data structure to values stored in the second data structure. The one or more bit arrays are efficiently summed via bit counting to obtain bit count sums. The bit count sums are used to identify costly database operations. Database operations are intelligently scheduled based on one or more bit count sums.

In one embodiment, the one or more bit arrays include a most significant bit (MSB) array and a least significant bit (LSB) array. The MSB and LSB arrays provide two-bit (2-bit) pairs that encode one of four data change states between received and stored ledger data. The data change states include no change [0,0], insert [0,1], update [1,0], and delete [1,1]. In the case of very large data ingestion processes, insert operations are generally much more prevalent in proportion to update or delete operations. To optimize for this scenario, the computing system analyzes bitmaps by performing bit counting on the MSB array and the LSB array to obtain an MSB sum and an LSB sum. Depending on the size of the data structure, the computing system infers how many insert operations are involved for updating a specific account by determining how many MSB bit and LSB bit pairs are [0,1]. If insert data cells are more than half of ingested data, then the computing system performs bulk copy to the target table in the database without going through a longer processing route.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
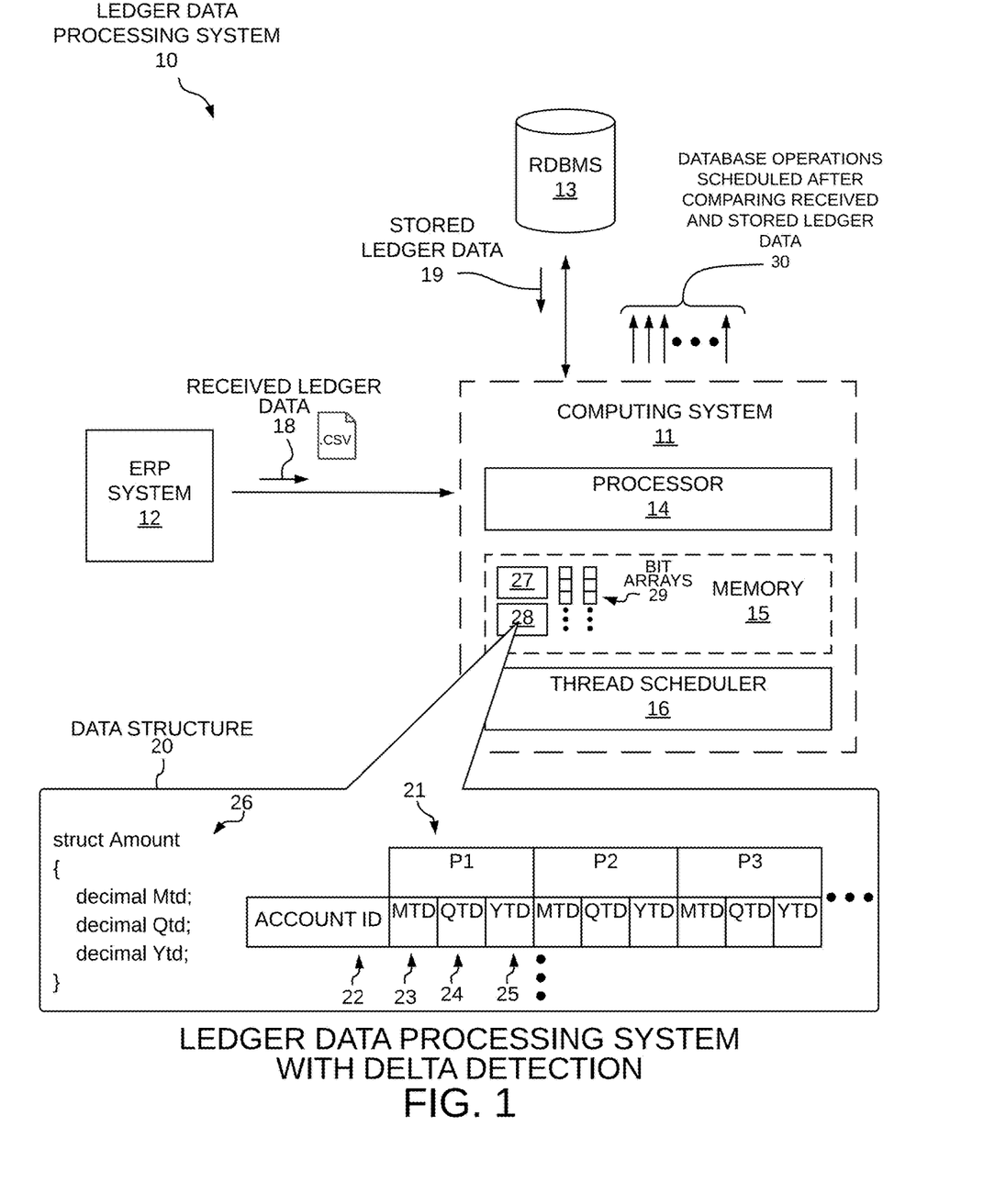
FIG. 1 is a diagram of a ledger data processing system 10 in accordance with one embodiment.

FIG. 1 is a diagram of a ledger data processing system 10 in accordance with one embodiment. The ledger data processing system 10 comprises a computing system 11, an Enterprise Resource Planning (ERP) system 12, and a relational database management system (RDBMS) 13. The computing system 11 includes a processor 14, a memory 15, and a thread scheduler 16. The ERP system 12 is any system suitable to generate and output time series information such as financial data. The RDBMS 13 is any suitable relational type database that stores information in tabular form. The processor 14 is any suitable processor capable of interpreting or executing instructions. The memory 15 is any suitable computer-readable medium that stores information, including data structures and computer readable instructions. The memory 15 includes a cache that provides immediate read and write storage functionality to the processor 14. Information stored in RDBMS 13 is used to generate one or more multidimensional array data structures that represent stored ledger data.

In operation, the computing system 11 receives ledger data 18 from the ERP system 12 and receives stored ledger data 19 from the RDBMS 13. In this embodiment, the ledger data 18 output by the ERP system 12 is in a tabular, plain-text format, such as a comma-separated values (CSV) file. The received ledger data 18 includes financial data across many accounts and over various time periods. For example, the received ledger data 18 includes month-to-date (MTD) account balances over a twelve-month (12-month) period or over a sixty-month (60-month) period. The RDBMS 13 stores ledger data 19 in a tabular, relational database format in accordance with a novel data structure 20. As explained below, the computing system 11 compares the new ledger data 18 received from ERP system 12 to stored ledger data 19 stored in RDBMS 13.

The data structure 20 stores aggregated values over one or more time periods. In this example, for each time entry (P1 . . . $P_N$), each account ("ACCOUNT ID") has entries for aggregated values over one or more time periods ("MTD", "QTD", and "YTD"). Reference numeral 21 identifies a single instance of the novel data structure. Reference numeral 22 identifies an account identifier. Reference numeral 23 identifies aggregated values over a month-to-date (MTD) time interval. Reference numeral 24 identifies aggregated values over a quarter-to-date (QTD) time interval. Reference numeral 25 identifies aggregated values over a year-to-date (YTD) time interval. For example, an account balance for a specific month will be stored in MTD block 23, the QTD amount up through the specific month will be stored in QTD block 24, and the YTD amount up through the specific month will be stored in YTD block 25. Reference numeral 26 identifies instructions that define the novel data structure 20 in the C programming language.

The data structure 20 provides a novel technique of storing and comparing information. The novel data structure 20 provides particularly favorable processing characteristics for analyzing and comparing time-series data, such as financial or general ledger data. The novel data structure 20 is storable in a continuous block of memory and tends to be more amenable to caching by processor 14 as compared to other data structures. The performance of computing system 11 is improved by storing and comparing received and stored ledger data via the data structure 20. The processor 14 tends to exhibit enhanced processing speeds by using the data structure 20 which is favorable for caching in memory 15.

After receiving ledger data 18 and stored ledger data 19, the computing system 11 loads the received ledger data 18 and stored ledger data 19 into memory 15. The received ledger data 18 is loaded into a first data structure 27 in memory 15. The stored ledger data 19 is loaded into a second data structure 28 in memory 15. Each of the first and second data structures 27 and 28 are of the novel data structure 20. Information provided by the ERP system 12 is not typically stored in a similar format as the novel data structure 20. As such, further processing is involved before the received ledger data 18 in the first data structure 27 is compared to the stored ledger data 19 in the second data structure 28. This involves aggregating values over various time periods of the received ledger data 18. For example, the ERP system 12 outputs account balance information for a MTD time period for each month in a 12-month to 60-month period. For each QTD account balance entry in the received ledger data 18, values are aggregated and loaded into the QTD and YTD time periods. This aggregation step is shown in more detail in connection with FIGS. 6 and 7.

After values are aggregated over various time periods for the received ledger data 18 and loaded into memory 15 as data structure 20, processor 14 compares values in the first data structure 27 corresponding to received ledger data 18 to values in the second data structure 28 corresponding to stored ledger data 19. Processor 14 is highly likely to employ the cache portion of memory 15 in performing this comparison due to the continuous blocks of memory involved in storing information in data structure 20. At least one single-bit array is generated during this comparison. The bit array indicates a data change state between the received ledger data 18 and the stored ledger data 19. In this embodiment, two one-bit arrays 29 are generated representing one of four data change states, including a no change state, an insert state, an update state, and a delete state.

After comparing the received ledger data 18 to the stored ledger data 19, the computing system 11 schedules database operations based on the comparison via the bit arrays 29. The data change states represented by the bit arrays 29 are used by the computing system 11 to identify computationally costly database operations involved in ingesting the received ledger data 18. In one embodiment, bit counting is performed on the bit arrays to identify computationally costly database operations across various accounts. For example, data that has not changed can be quickly identified and skipped. More computationally costly database operations, such as insert or delete, can be batched together in parallel for earlier processing as compared to less costlier database operations such as update operations. Reference numeral 30 identifies database operations scheduled and prioritized based on this novel comparison.

Figure 2:
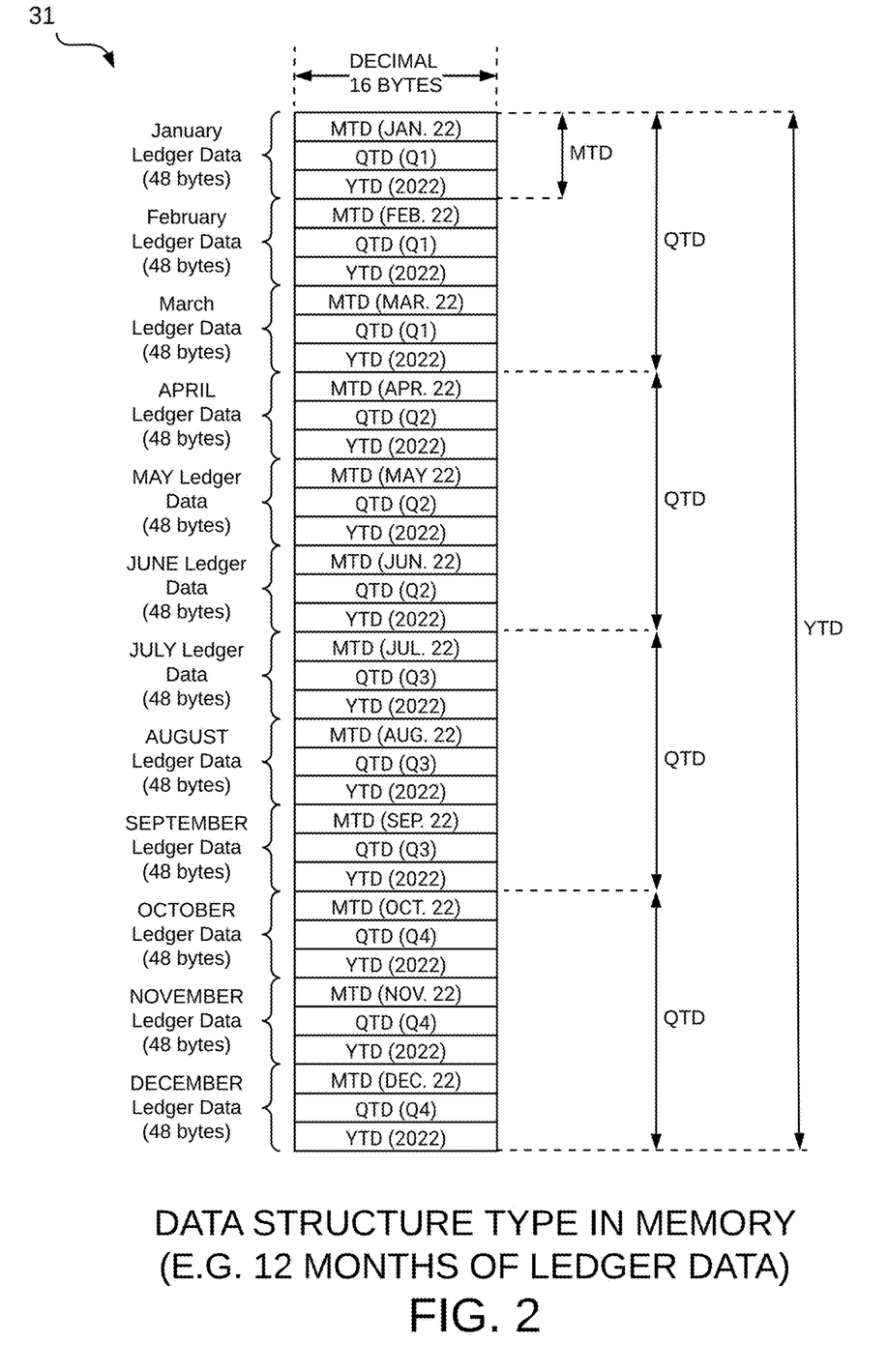
FIG. 2 is a detailed diagram of a novel data structure 31 in accordance with one embodiment.

FIG. 2 is a detailed diagram of a novel data structure 31 in accordance with one embodiment. The data structure 31 is one example of the data structure 20 of FIG. 1. The novel data structure 31 stores balance information for one account over a twelve-month (12-month) period. In this example, data structure 31 stores values in a decimal data type of sixteen bytes (16-bytes). It is appreciated that in other embodiments, other data types, such as float or double data types, are used to store values in the novel data structure 31. In this example, ledger data 18 received from ERP system 12 only includes entries for MTD blocks. Before comparison, computing system 11 aggregates and determines values for QTD and YTD blocks in data structure 31 as will be explained below.

The memory cost of a single instance of the data structure 31 is 48 bytes. The computing system 11 processes at least a year or sometimes five (5) years depending on the configuration of the ERP system 13 during ingestion. The array of ingested data cost at minimum 576 continuous bytes to at max 2880 bytes (2.8 KB) for a given segment key. The memory cost of the segment key in this example is 40 bytes as it stores all the segment values in numeric form. Combining received and stored ledger data 18 and 19, the total memory cost per single segment key would come out to 6000 bytes. This compact data structure allows processing 100 k unique segment keys using a maximum of 550 MB of memory.

Figure 3:
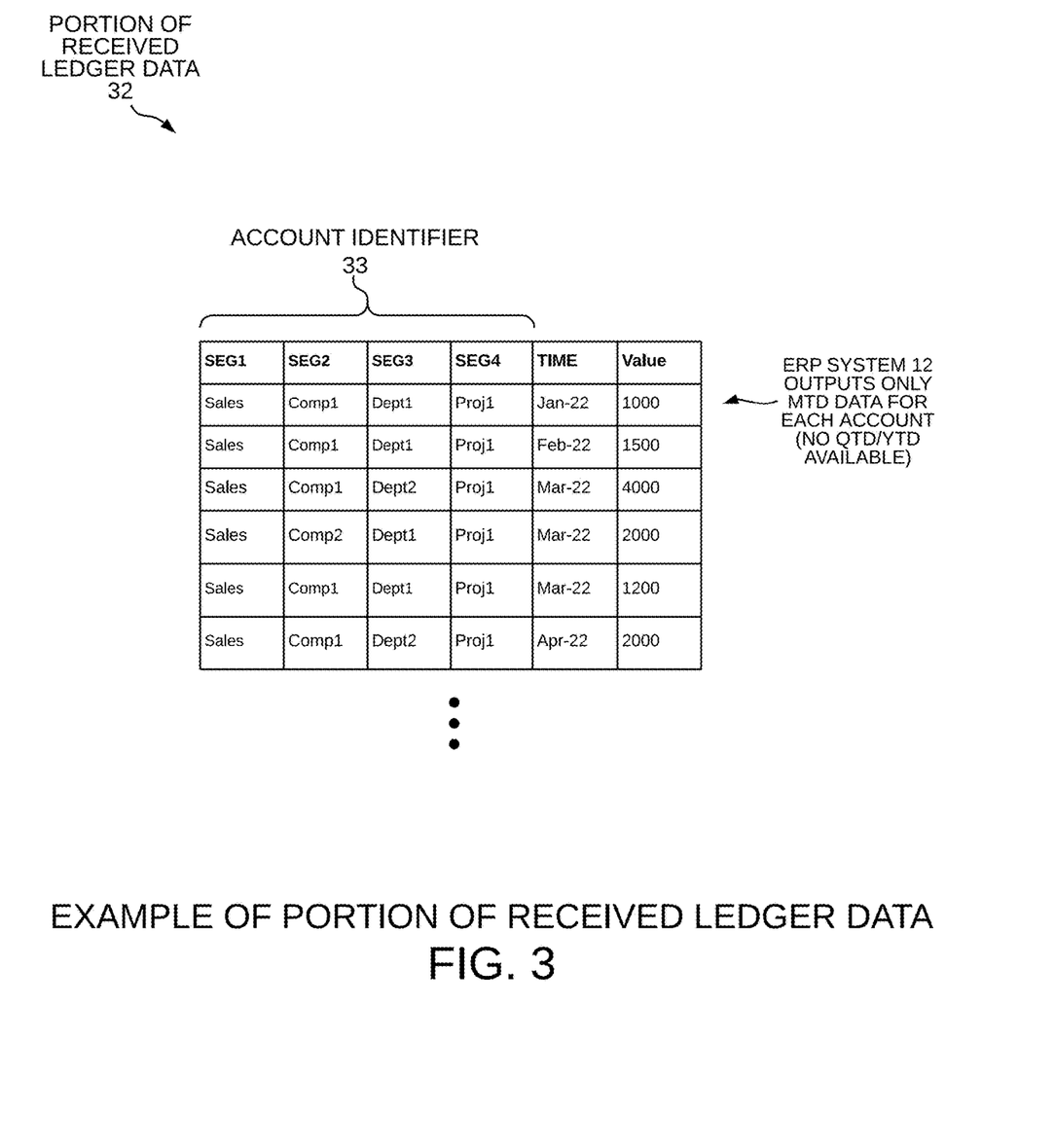
FIG. 3 is a table showing a portion 32 of received ledger data 18 received from the ERP system 12.

FIG. 3 is a table showing a portion 32 of ledger data 18 received from the ERP system 12. The portion 32 of received ledger data 18 is a small subset of received ledger data 18 received from ERP system 12. Entries in received ledger data 18 are typically identified with an account identifier 33 spanning multiple segments. In this example, each account is identified via four identifier code segments that together make up an account identifier. The ledger data 18 provided by the ERP system 12 provides account balance information in only MTD time periods. Before comparison can be performed, values are aggregated over QTD and YTD time periods for the received ledger data 18 so that these values can be compared to stored ledger data 19 in the RDBMS.

The portion 32 of received ledger data 18 shows MTD account balances for three accounts, namely accounts "Sales-Comp1-Dept1-Proj1", "Sales-Comp1-Dept2-Proj1", and "Sales-Comp2-Dept1-Proj1". It is appreciated that this smaller subset 32 of the received ledger data 18 is shown here only for explanatory purposes to describe the structure and operation of computing system 11 with delta detection techniques. In commercial applications, received ledger data 18 includes rows for various accounts spanning several orders of magnitude. How the portion 32 of received ledger data 18 is ingested by computing system 11 is described in detail below.

Figure 4:
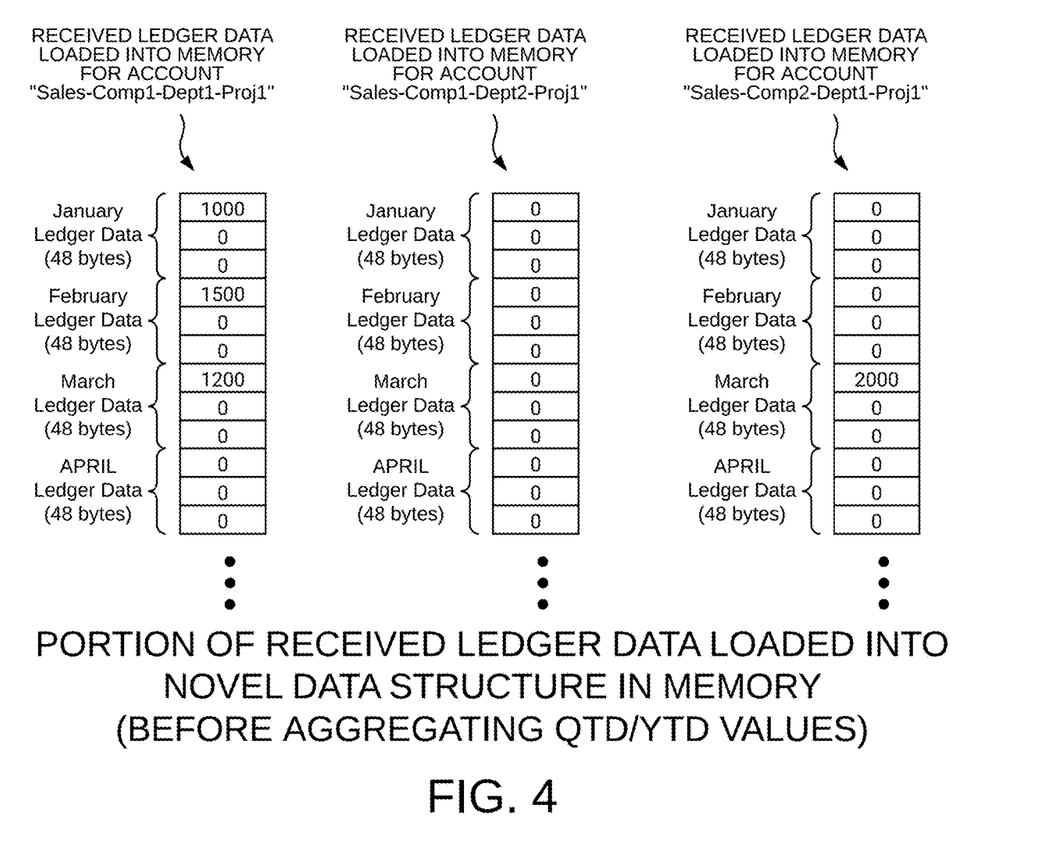
FIG. 4 is a diagram showing how portion 32 of received ledger data 18 shown in FIG. 3 is loaded into memory 15.

FIG. 4 is a diagram showing how portion 32 of received ledger data 18 shown in FIG. 3 is loaded into memory 15. Values for QTD and YTD blocks are initially zero because the ERP system only outputs MTD information for accounts.

Figure 5:
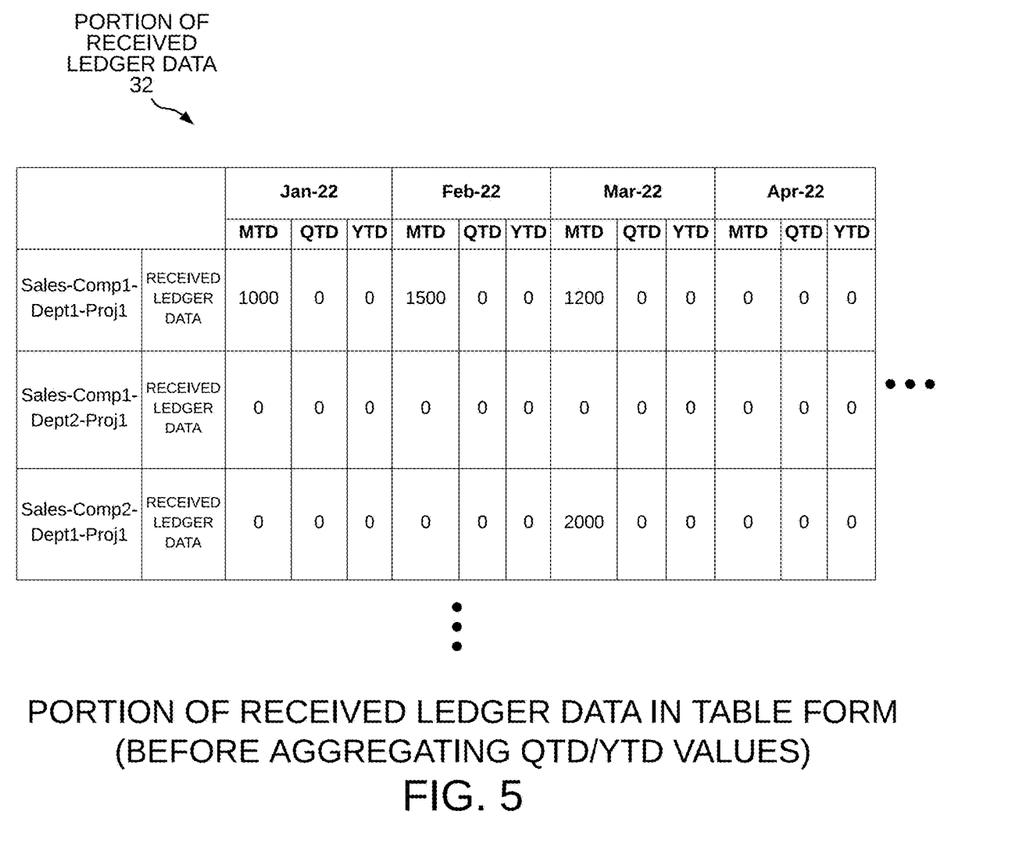
FIG. 5 is a table showing values of portion 32 of received ledger data 18 shown in FIG. 3.

FIG. 5 is a table showing values of portion 32 of received ledger data 18 shown in FIG. 3. The table in FIG. 5 is a tabular representation of received ledger data 18 initially loaded into memory 15.

Figure 6:
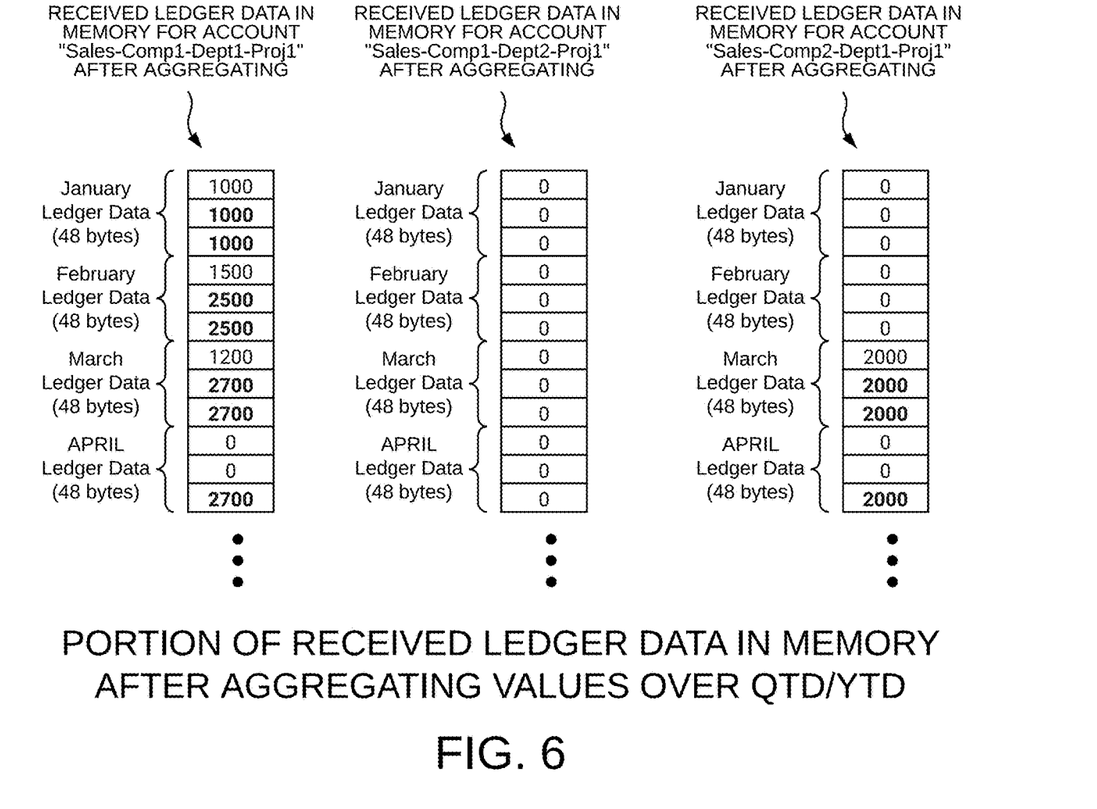
FIG. 6 is a diagram showing how values are aggregated over various time intervals for portion 32 of received ledger data 18 shown in FIG. 3.

FIG. 6 is a diagram showing how values are aggregated over various time intervals for portion 32 of received ledger data 18 shown in FIG. 3. The processor 14 aggregates values over QTD and YTD time periods and loads these values into the novel data structure in memory 15. Aggregated values are presented in a bold typeface weight.

Figure 7:
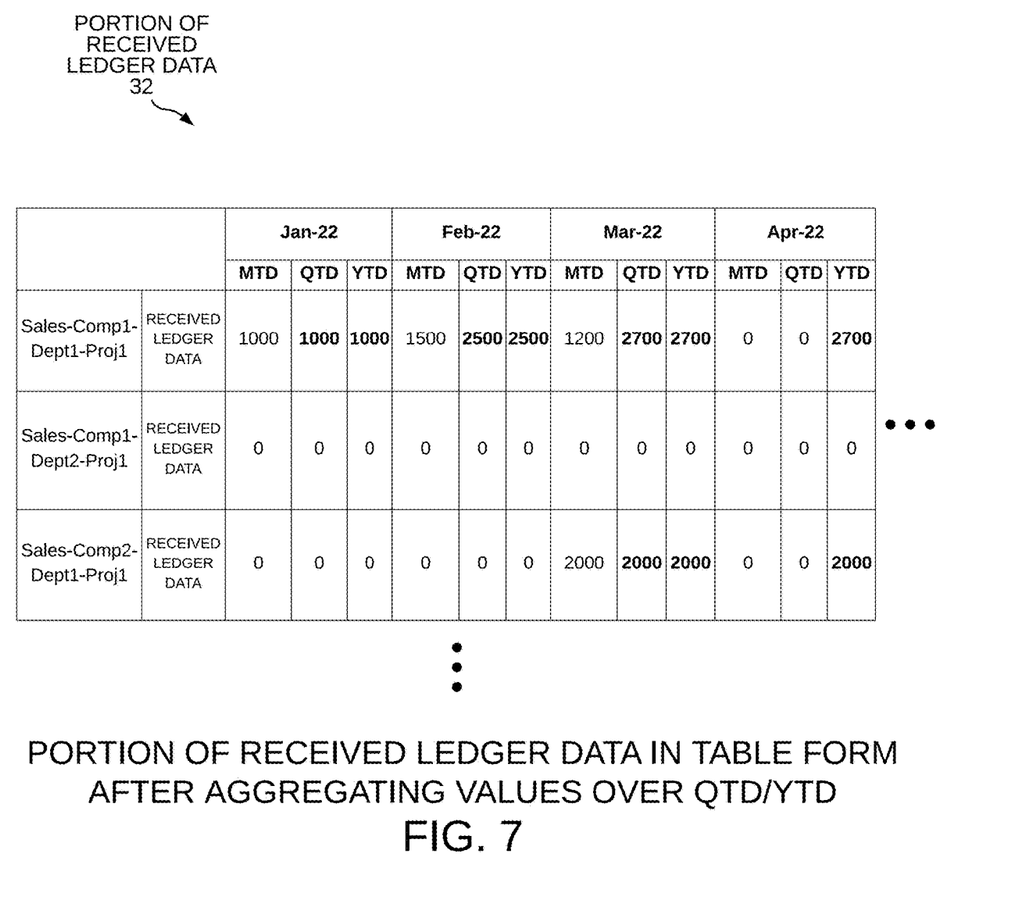
FIG. 7 is a table showing how values are aggregated over various time intervals for portion 32 of received ledger data 18 shown in FIG. 3.

FIG. 7 is a table showing how values are aggregated over various time intervals for portion 32 of received ledger data 18 shown in FIG. 3. The table of FIG. 7 is a tabular representation of received ledger data after aggregated values over QTD and YTD time periods. After values are aggregated over various time periods in accordance with data structure 31, the processor 14 is operable to compare received ledger data 18 to stored ledger data 19.

Figure 8:
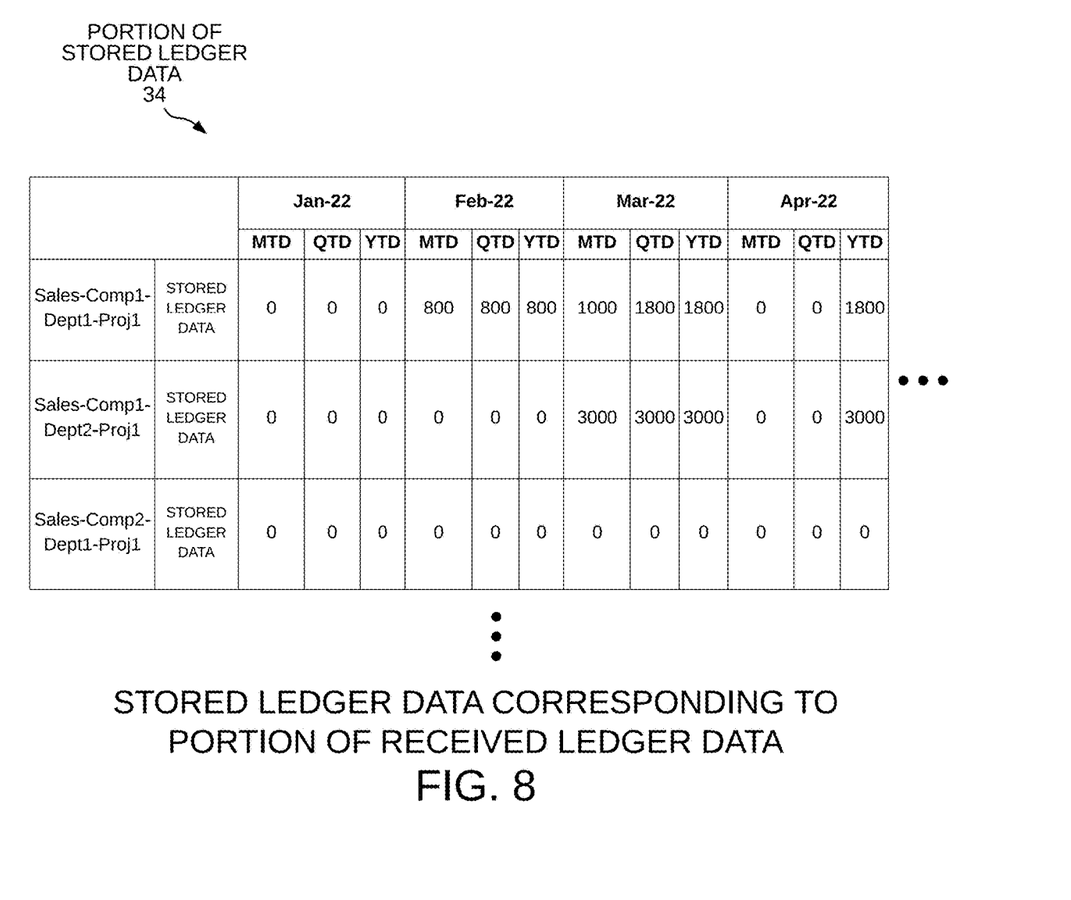
FIG. 8 is a table showing portion 34 of stored ledger data 19 corresponding to portion 32 of received ledger data 18 shown in FIG. 3.

FIG. 8 is a table showing portion 34 of stored ledger data 19 corresponding to portion 32 of received ledger data 18 shown in FIG. 3. The computing system 11 compares portion 34 of stored ledger data 19 to portion 32 of received ledger data 18 using novel delta detection.

Figure 9:
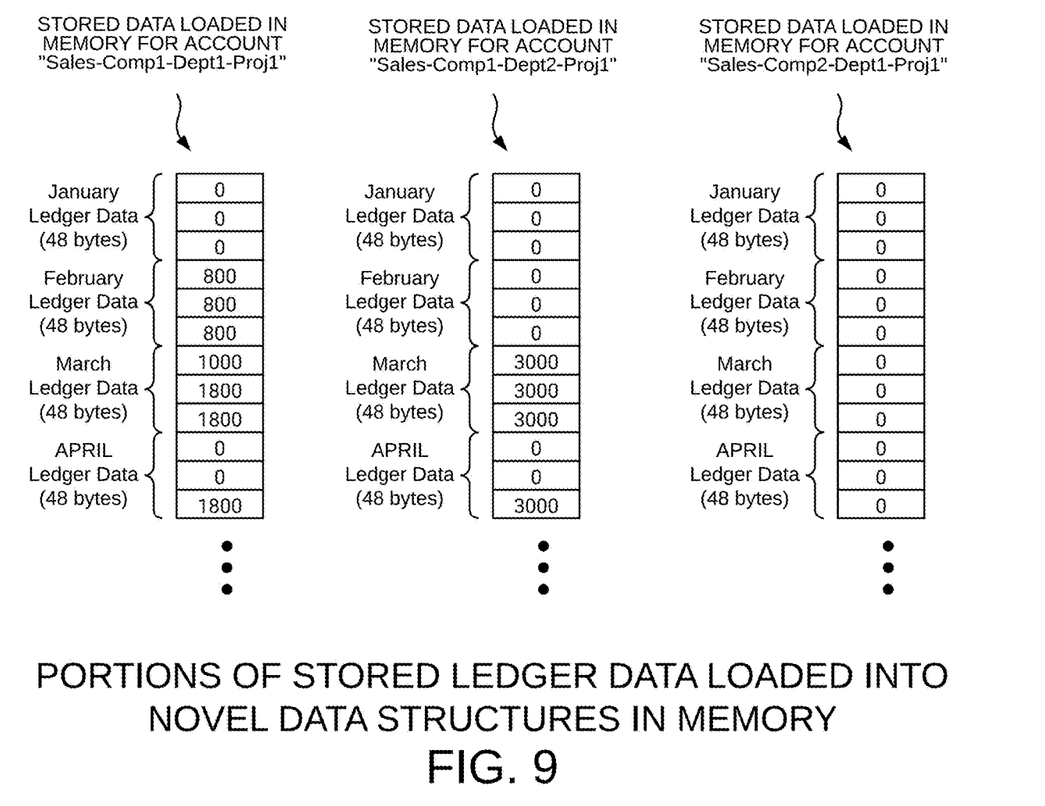
FIG. 9 is a diagram showing portion 34 of stored ledger data 19 shown in FIG. 8 loaded into memory 15.

FIG. 9 is a diagram showing portion 34 of stored ledger data 19 shown in FIG. 8 loaded into memory 15.

Figure 10:
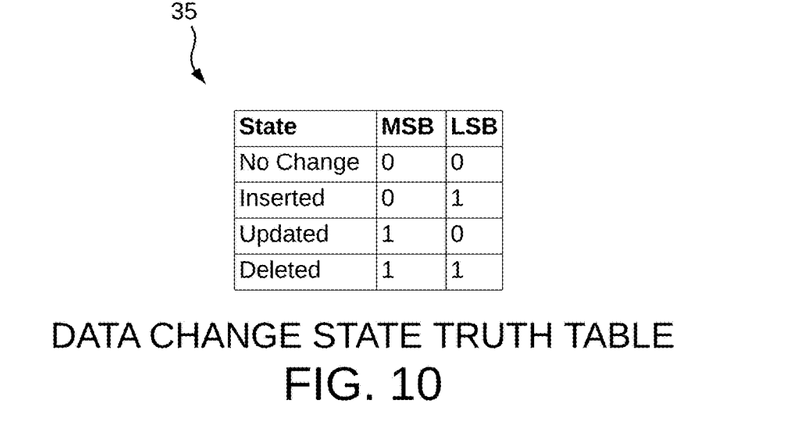
FIG. 10 is a truth table for two one-bit (1-bit) array data structures.

FIG. 10 is a truth table 35 for two one-bit (1-bit) array data structures. In this embodiment, the combination of two one-bit (1-bit) arrays represent data change state in a compact and highly scalable fashion. The two one-bit (1-bit) arrays comprise a first bit array 36 and a second bit array 37. The first bit array 36 is referred to as a most significant bit (MSB) array and the second bit array 37 is referred to as a least significant bit (LSB) array.

Figure 11:
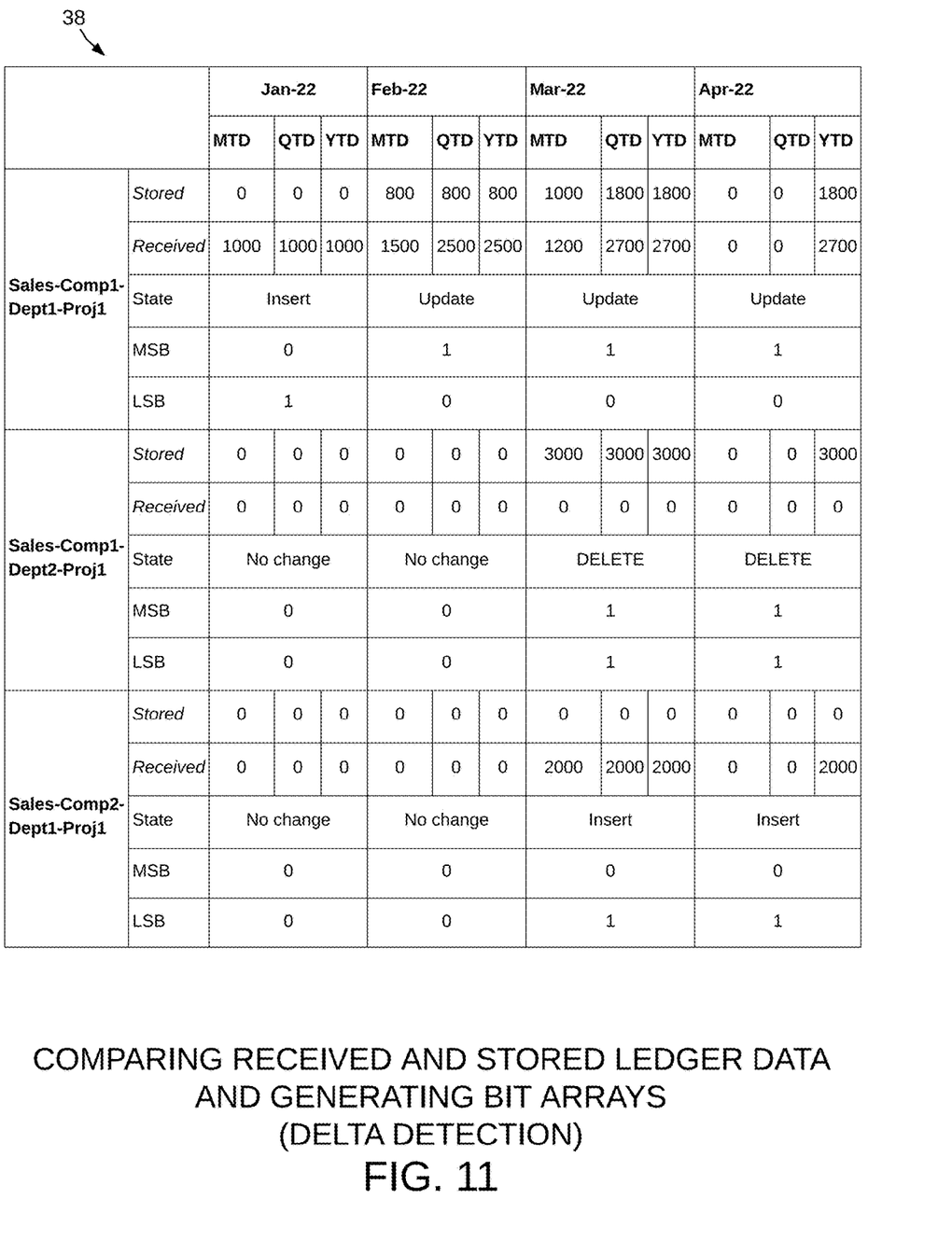
FIG. 11 is a table 38 showing how received ledger data 18 is compared to stored ledger data 19 to generate one or more bit arrays in accordance with novel delta detection.

FIG. 11 is a table 38 that shows how received ledger data 18 is compared to stored ledger data 19 to generate one or more bit arrays in accordance with novel delta detection. For each time entry, received ledger values are compared to stored ledger values. MSB and LSB bits are set according to whether data between the received and stored ledger data has not changed [0,0] or involves insertion of new data [0,1], updating data [1,0], or detention of data [1,1]. An example of a no change data change state is a "Jan-22" entry for the "Sales-Comp1-Dept2-Proj1" account in which both the MSB and LSB bits are set to zero. An example of an insert data change state is a "Jan-22" entry for the "Sales-Comp1-Dept1-Proj1" account in which the MSB bit is set to zero and the LSB bit is set to one. An example of an update data change state is a "Feb-22" entry for the "Sales-Comp1-Dept1-Proj1" account in which the MSB bit is set to one and the LSB bit is set to zero. An example of a delete data change state is a "Mar-22" entry for the "Sales-Comp1-Dept2-Proj1" account in which both the MSB and LSB bits are set to one.

Figure 12:
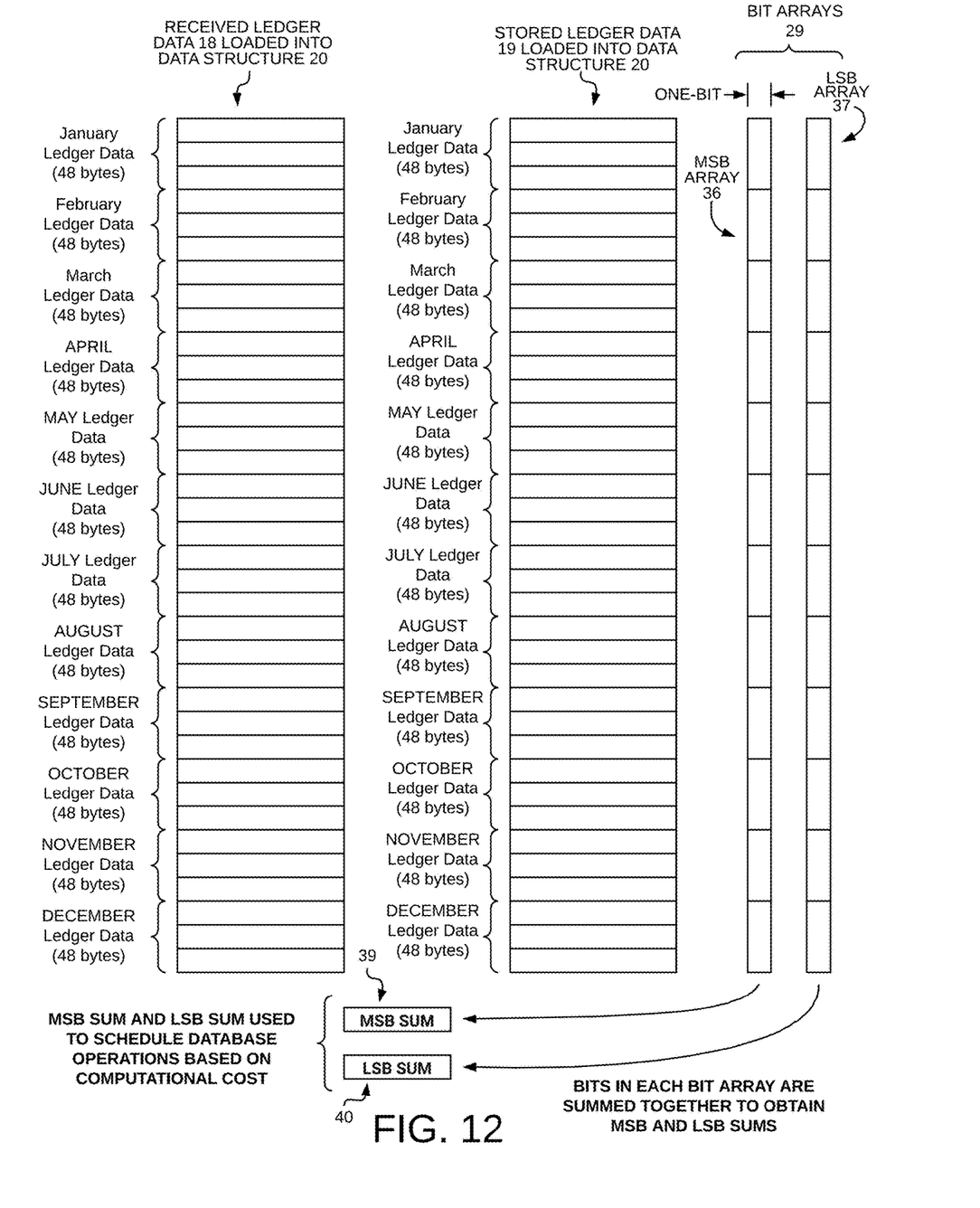
FIG. 12 is a diagram showing how bit arrays generated during comparison of received and stored ledger data are used to schedule database operations.

FIG. 12 is a diagram showing how bit arrays generated during comparison of received and stored ledger data are used to scheduled database operations. For example, if an account has zero MSB and LSB sums, then no updates are required after receiving data for the account. Thread schedule 16 is able to identify more costly database operations by comparing MSB and LSB sums between accounts during the ingestion process. For additional information on how to perform efficient and highly scalable bit counting of bit array data structures, see: U.S. Patent Application No. 63/337,141, entitled "System To Process General Ledger Data In Cache With Delta Detection," filed on May 1, 2022, the subject matter of which is incorporated herein in its entirety.

Performing input/output operations are almost always computationally costlier than processor-bound operations. The novel data structure 20 is optimized for relational database operations. Before updating data stored in the RDBMS 13, data ingested into memory 15, such as the information shown in FIG. 11, needs to be transformed back into tabular structure. Specialized database APIs, such as SQL Bulk Copy, are used to flush the data at a faster rate to RDBMS 13 and ingested data in memory 15 is transformed on the fly row by row with a filter transforming only data which has some modification indicated by the data change state, such as insert, update, or delete. The flushed data uses the account identifier (combined segment information), computed balance amounts, and the record state. Once the data is written, the computing system 11 performs set operations at the level of RDBMS 13 to insert, delete, and update the records into the target table.

In the case of very large data ingestion processes, insert operations are generally much more prevalent compared to update or delete operations. To optimize for this scenario, the system analyzes the bitmaps by performing bit counting on the MSB array 36 and the LSB array 37 thereby obtaining a MSB sum 39 and an LSB sum 40. Depending on the size of the data structure, computing system 11 infers how many insert operations are involved for updating a specific account by determining how many MSB bit and LSB bit pairs are [0,1]. If insert data cells are more than half of ingested data, then computing system 11 performs bulk copy to the target table in RDBMS 13 without going through a longer processing route.

Figure 13:
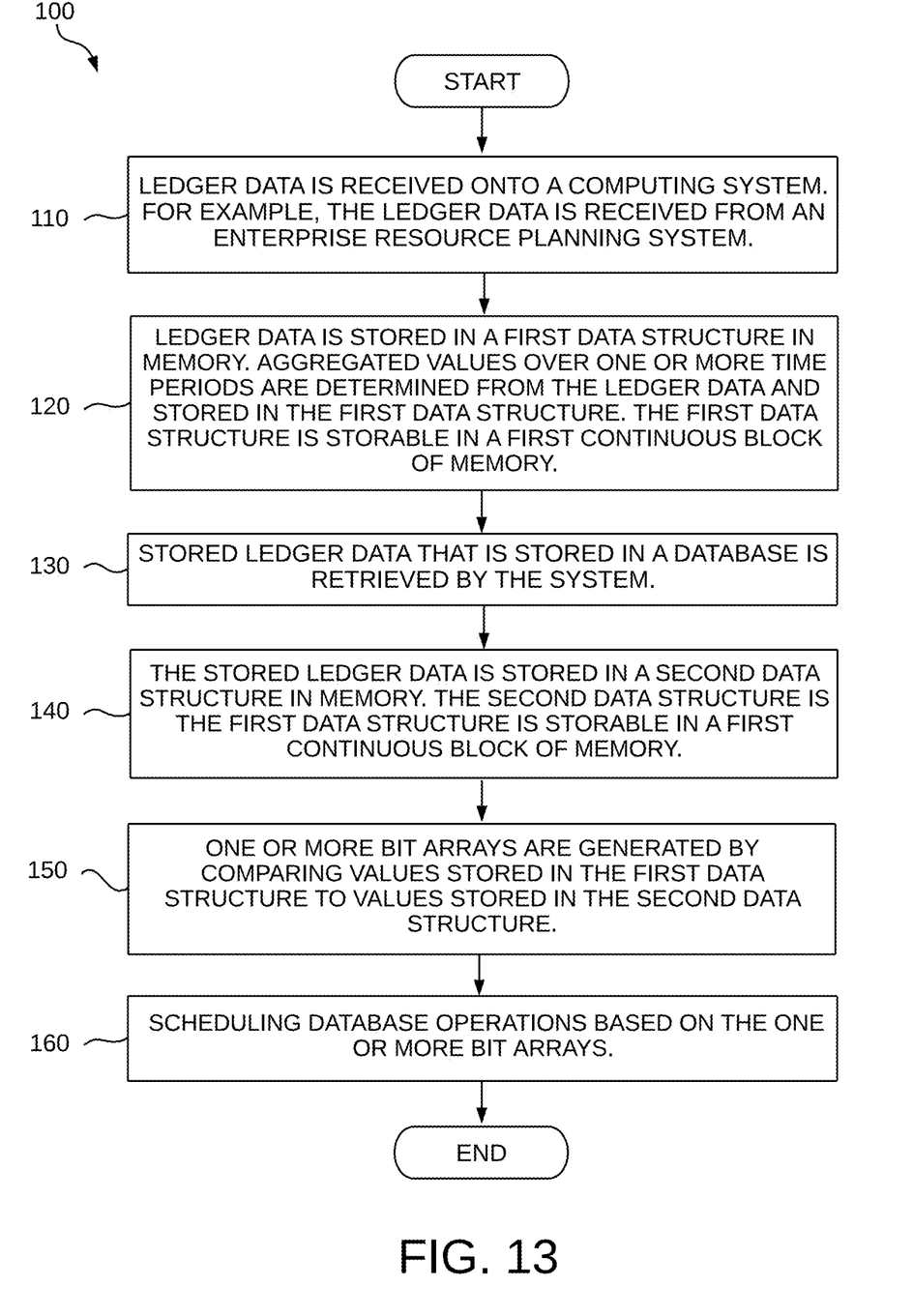
FIG. 13 is a diagram of a method 100 in accordance with one novel aspect.

FIG. 13 is a diagram of a method 100 in accordance with one novel aspect. In a first step (step 110), ledger data is received onto a computing system. In the example of FIG. 1, an ERP system 12 supplies ledger data 18 to computing system 11. The ledger data 18 corresponds to a general ledger that records all transactions of an entity across all accounts of the entity. In a second step (step 120), ledger data is stored in a first data structure in memory. Aggregated values over one or more time periods are determined from the ledger data and stored in the first data structure. The first data structure is storable in a first continuous block of memory. In a third step (step 130), stored ledger data stored in a database is retrieved. In a fourth step (step 140), the stored ledger data is stored in a second data structure in memory. The second data structure is storable in a second continuous block of memory. In a fifth step (step 150), one or more bit arrays are generated by comparing values stored in the first data structure to values stored in the second data structure. In a sixth step (step 160), database operations are scheduled based on the one or more bit arrays.

Although certain specific embodiments are described above for instructional purposes, the teachings of this patent document have general applicability and are not limited to the specific embodiments described above. Various embodiments disclosed involve financial applications, however, it is appreciated that these novel techniques and systems are applicable to any type of multi-dimensional time series data stored and ingested in any significant quantity. Accordingly, various modifications, adaptations, and combinations of various features of the described embodiments can be practiced without departing from the scope of the invention as set forth in the claims.

What is claimed is:

1. A system comprising:
   a memory that stores received ledger data in a first data structure and stored ledger data in a second data structure, wherein the stored ledger data is received from a database, and wherein each of the first and second data structures is storable in a continuous block of memory;
   means for determining aggregated values over one or more time periods for the received ledger data, wherein the means is also for storing the aggregated values in the first data structure, and wherein the means is also for generating one or more bit arrays by comparing values stored in the first data structure to values stored in the second data structure.

2. The system of claim 1, wherein the means is a processor or controller.

3. The system of claim 1, wherein operations on the database are scheduled based on the one or more bit arrays.

4. The system of claim 1, wherein the time periods include at least one of month to date (MTD), quarter to date (QTD), or year to date (YTD).

5. The system of claim 1, wherein the one or more bit arrays indicate data change states between received ledger data and stored ledger data, wherein data change states include a no change state, an insert state, an update state, and a delete state.

6. The system of claim 1, wherein the bit array includes a most significant bit (MSB) array and a least significant bit (LSB) array, wherein the means is also for summing values in the MSB array thereby obtaining a MSB sum, and wherein the means is also for summing values in the LSB array thereby obtaining a LSB sum.

7. The system of claim 6, wherein database operations are scheduled based on the MSB sum and the LSB sum.

8. The system of claim 1, wherein each of the first data structure and the second data structure is a data type configured for storing in cache memory.

9. The system of claim 1, wherein the ledger data is received from an Enterprise Resource Planning (ERP) system in plain text format, and wherein the database is a relational database management system (RDBMS).

10. A method comprising:
    receiving data;
    storing received data in a first data structure, wherein aggregated values over one or more time periods are determined from the received data and stored in the first data structure, and wherein the first data structure is storable in a first continuous block of memory;
    retrieving stored data stored in a database;
    storing the stored data in a second data structure, wherein the second data structure is storable in a second continuous block of memory; and
    generating one or more bit arrays by comparing values stored in the first data structure to values stored in the second data structure.

11. The method of claim 10, wherein each of the received data and the stored data is time series data, and wherein the stored data retrieved from the database and stored in the second data structure does not require aggregation of values over one or more time periods.

* * * * *